United States Patent
Hammond

[15] 3,643,820
[45] Feb. 22, 1972

[54] FLOW CONTROL BAFFLE FOR A BIN UNLOADER

[72] Inventor: Ronald W. Hammond, Villa Park, Ill.
[73] Assignee: A. O. Smith Corporation, Milwaukee, Wis.
[22] Filed: Jan. 19, 1970
[21] Appl. No.: 3,673

[52] U.S. Cl. .............................214/17 D, 222/200, 222/243, 222/409
[51] Int. Cl. .......................................................B65g 65/44
[58] Field of Search ....................................214/17 R, 17 D; 198/59–61; 222/199, 200, 243, 409

[56] References Cited

UNITED STATES PATENTS

| | | |
|---|---|---|
| 3,025,981 | 3/1962 | Hannes..............................214/17 DA |
| 3,185,321 | 5/1965 | Kemp...................................214/17 R |
| 2,926,961 | 3/1960 | Diebold............................214/17 R X |
| 3,401,787 | 9/1968 | Vaka.............................214/17 DA X |

Primary Examiner—Robert G. Sheridan
Attorney—Andrus, Sceales, Starke & Sawall

[57] ABSTRACT

A flow control baffle is disposed over a conveyor operating in a channel pit at the bottom of a storage bin. The baffle extends upward into the bin and has inclined baffle walls which channel the stored material around the sides of the baffle into the conveyor. The baffle has a bottom surface disposed over the conveyor and has elongated ribs extending below the bottom surface to establish the level of stored material in the conveyor. A vibration motor assembly is used to agitate the baffle independently of the conveyor.

8 Claims, 6 Drawing Figures

PATENTED FEB 22 1972

Inventor
Ronald W. Hammond
By
Andrus, Sceales, Starke & Sawall
Attorneys 3,643,820

FLOW CONTROL BAFFLE FOR A BIN UNLOADER

BACKGROUND OF THE INVENTION

This invention relates to conveyor bin unloader systems and more particularly to flow controls for conveyor unloader systems.

Storage bins or hoppers, such as would be used for storing salt, powders, or similar friable materials, commonly have conveyor unloaders at their bottoms. Most unloader systems require some means of controlling material flow onto the conveyor in the bin such as baffle devices.

Such devices have been provided but have inadequacies. For instance, some materials are reluctant to flow and therefore are difficult to unload uniformly. Under some conditions, such as with frozen or caked stored material, the conveyor unloading operation can be stopped by the resistance to flow around the baffle.

Another disadvantage with some prior baffles are that they loaded directly on top of the conveyor. The weight of the stored material was then carried by the conveyor in these systems, and thus required higher starting torque motors than otherwise. Further, it was found that some materials would not freely fall into the conveyor with such baffles, because the material tended to arch over and compact. Uniform unloading was thus impaired.

Other control baffles were devised which contemplated solving such difficulties. These still had problems. The latter baffles were disposed over the conveyors and directed material flow around the sides of the baffles to the conveyors. This design tended to relieve the conveyors of the full weight of the stored material. However, material still piled up on the conveyors, adding unnecessary weight and creating nonuniform discharge from the bins. Further, the stored material tended to flow first from one part of the bin, thus emptying the bin to unequal levels and creating unequal stresses on the storage structure walls.

The problem of reluctant flowage into the conveyor has been attacked by providing agitating apparatus with or separate from the baffle assemblies. However, these generally operated from the conveyor drives and did not provide full discharge flow control by the agitation in the bin.

SUMMARY OF THE INVENTION

The invention is directed to solving the above difficulties and advances beyond the previous development to provide further advantageous features. Various advantages will be apparent from the drawings and description.

The invention provides a means of controlled discharge of stored material onto a conveyor system. The structure of the invention relieves the conveyor system from extra pileup of stored material and provides uniform and more precisely controlled flow to the conveyor.

These advantages are accomplished by an assembly including an elongated load control baffle which has inclined baffle plates functioning to channel material flow around the sides of the control baffle to the conveyor. The baffle is disposed over a channel in which a conveyor operates and the baffle plates are spaced from the edges of the conveyor channel along its length. The body of the control baffle is disposed over the conveyor to relieve it from the weight of the stored material in the bin.

To further avoid pileup of excess material on the conveyor, the baffle has a bottom surface disposed over the conveyor along its length at a predetermined level in accordance with the desired discharge rate for unloading. However, for certain kinds of conveyor unloaders, such as vibratory unloaders, a mere bottom surface on the baffle, while determining the proper level of the material in the conveyor, will tend to compact the material beneath it and thus add weight on the conveyor and cause irregular flow out of the bin.

To control the material flow from the bin even more accurately, as well as to lessen the power requirements for the conveyor unloader drive, the baffle control of the invention has elongated, narrow ribs extending along a substantial length of the bottom surface on the baffle. The ribs determine the level of the stored material which has entered the conveyor, but the compacting action by the operation of the conveyor is avoided.

A further advantageous feature of the ribs is that they may be shaped in accordance with the flow characteristics of the stored material and the desired control of the level of material in the entire bin. When the ribs are tapered or similarly shaped, they may be used to establish a higher level at the discharge end of the conveyor than at the inside end. Thus, proper shaping of the ribs will permit continuous flowage of material along the entire length of the bin rather than from only one portion at a time. This will be done when it is desired to maintain a uniform level of material in the bin structures.

A further feature of the baffle control of the invention is that it includes a vibrator system which may be used to agitate caked or frozen materials or to otherwise more accurately control the flow of any material stored in a bin or hopper. This feature is not dependent on the operation of the conveyor unloader and can be used with any type conveyor.

The agitator structure is integral with the control baffle and is comprised of inwardly inclined upper surface walls extending upwardly to a peak above the conveyor. A vibrator motor and assembly is attached to the baffle and serves to vibrate the baffle to agitate the stored material and cause it to flow around the sides and around the baffle plates to the conveyor. The rate of vibration can be controlled to further determine the discharge rate of the stored materials, or the vibration can be terminated when increased flow is not needed.

Thus, the invention provides various advantages of precise flow control under varied conditions and serves to lessen the power requirements for the unloader conveyor drive.

The figures illustrate the best embodiments presently contemplated by the inventor.

In the drawings:

FIG. 4 is a bottom plan view of the baffle;

DESCRIPTION

Figure 1:
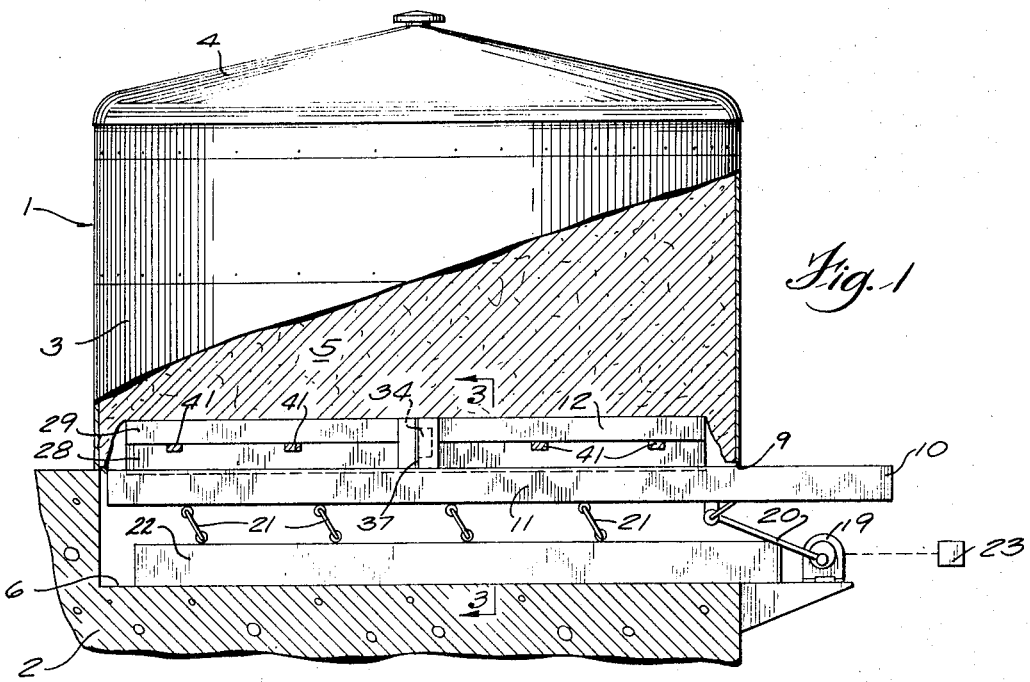
FIG. 1 is a side elevational view of the bin with FIG. 1.
Figure 2:
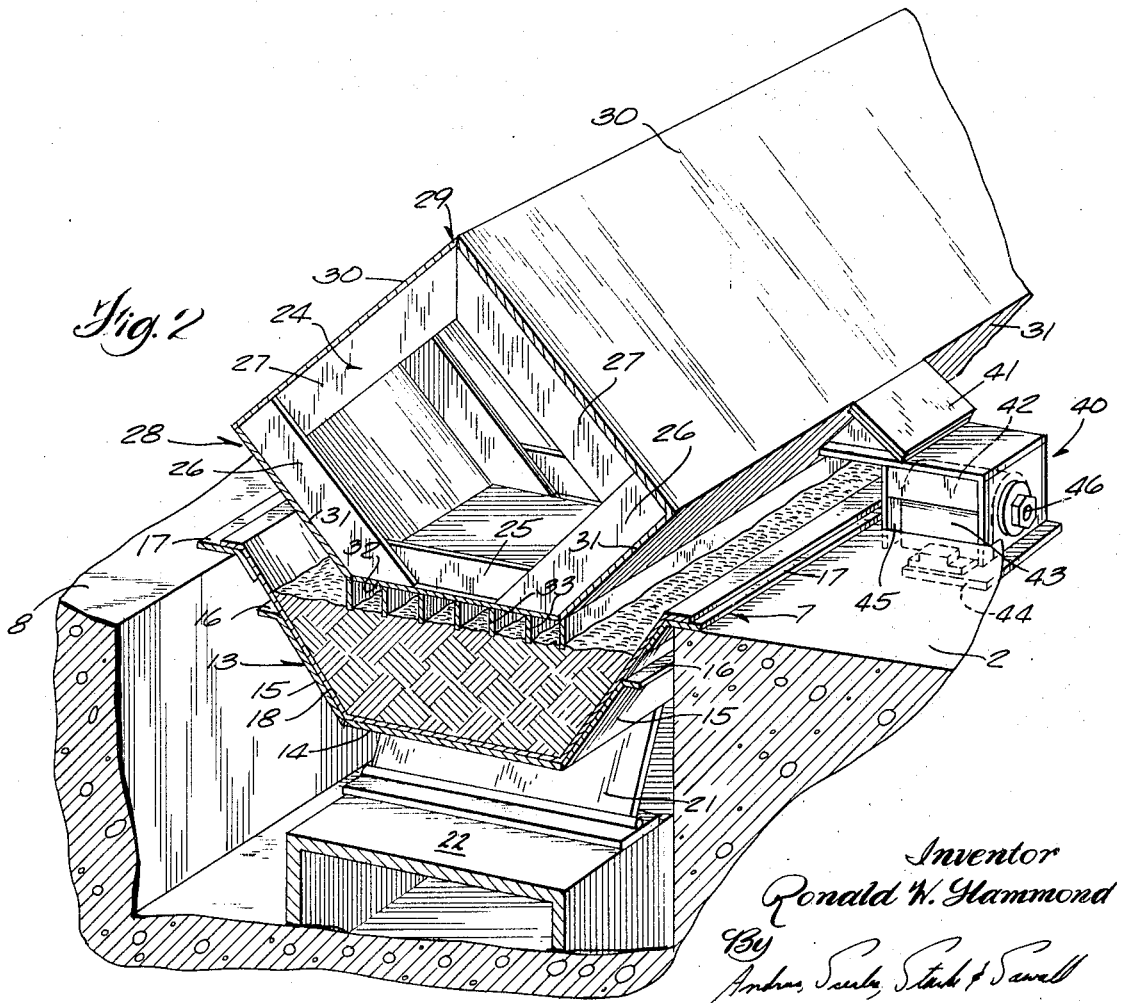
FIG. 2 is a perspective view of the invention with parts in section.
Figure 3:
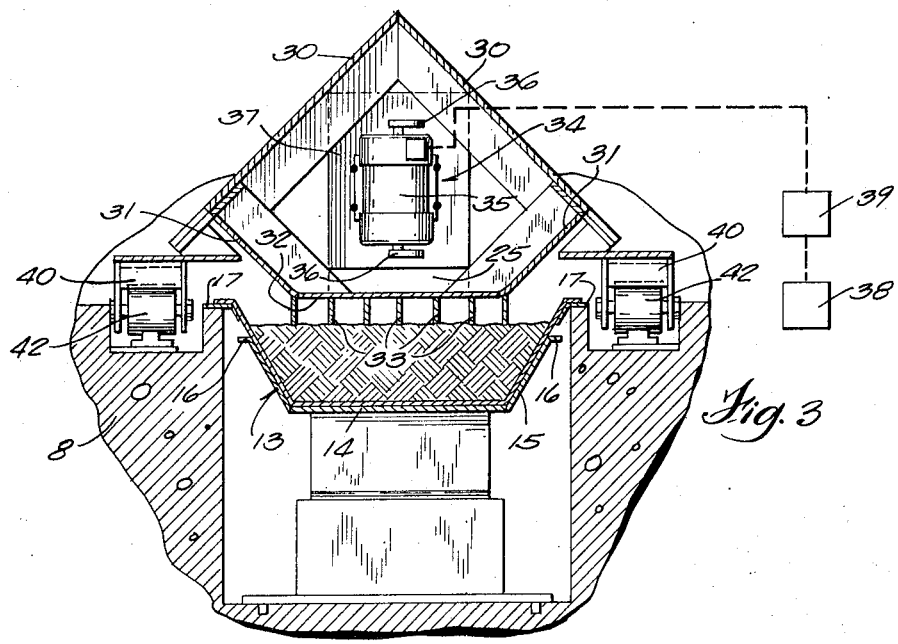
FIG. 3 is a section taken along line 3—3 of FIG. 1.

Shown in the figures is a storage bin 1 supported on a foundation 2 and having a cylindrical sidewall 3 with a roof 4 on top forming a generally enclosed structure for storing a material 5, such as salt, powders or grain, or other generally friable materials. Wall 3 and roof 4 may be constructed of glass lined metal sheets and are shown accordingly.

In order to provide room for unloading means, foundation 2 has an open top channel 6 which is an elongated tunnel through the foundation and may have side recesses for adequate operating room. The sidewalls of channel 6 define lengthwise top edges 7 and 8 along the length of the channel, which extends from wall 3, along a diameter to an opening 9 in the bin. Material 5 may be discharged through opening 9 and a conveyor discharge end 10.

The unloader system is disposed in channel 6 and includes a conveyor 11 and a control baffle 12 which operate to discharge material 5 from end 10 at a controlled rate. In general, baffle 12 channels the flow of material to conveyor 11, which in turn carries the material to the outside.

Conveyor 11 is shown as the vibrator type commonly in use as bin unloaders. Well-known endless belt conveyors could also be used with the invention, although there are special advantages for the invention in use with the vibrator type. As in the usual construction of conveyor 11, a flat bottom, U-shaped metal pan 13 extends nearly the length of channel 6, occupying the top portion of the space provided by the recess and serving as the unloading member. Having a flat bottom 14 and sidewalls 15 extending upward therefrom at an incline or vertically as desired, pan 13 is utilized to hold a portion of material 5 above the floor of channel 6 but beneath channel edges 7 and 8.

To avoid spillage into the recess, sidewalls 15 have outwardly flanged lips 16 fully along their respective top edges. Correspondingly, a pair of downwardly flanged, metal floor strips 17 are attached by suitable means to foundation 2, fully along channel 6 and extend over the recess beyond edges 7 and 8 and over flanged lips 16 of conveyor pan 13. A liner 18, completing the assembly, extends across the width of channel 6 and is bonded or clamped to both floor strips 17 along their full lengths. Being flexible and of sufficient size, liner 18 suspends from strips 17 and rests against the surfaces of pan sidewalls 15 and flat bottom 14 to assume a corresponding flat bottom U-shape. This structure avoids spillage and permits pan movement relative to channel 6, liner 18 and the stored material 5 being carried by the pan. Other known pan and pan attachment assemblies are equally suitable for use with the invention.

For purposes of vibrating conveyor 11, a motor and crank assembly 19 are disposed at opening 9. Assembly 19 may be any conventional variety used in vibratory conveyor systems and operates a crank 20, which is connected to pan 13 for shaking the pan. The pan is pivotally supported over the bottom of channel 6 by pivotal supports 21 connecting pivotally between the bottom of the pan and box frame support 22 disposed on the bottom of the channel.

Any suitable switch control 23, shown schematically connected to the motor of assembly 19, may be used to control the vibration of pan 13. It is contemplated that the unloading operation will be initiated and terminated by use of switch 23.

Flow control baffle 12 controls the flow of material 5 to conveyor 11 in accordance with the invention. The body of baffle 12 is elongated with inclined sides and any frame construction suitable to provide this configuration may be utilized. In the example shown, a frame 24 has a plurality of frame sections, each with a bottom flat bar 25 being welded to lower side flat bars 26 which are in turn welded to top side flat bars 27. Flat bars 27 are also welded together at the top to complete a five-side box frame section. The sections are spaced apart in accordance with structural requirements of stored material weight in any particular bin.

The shape of box frame 24 determines the body shape for baffle 12 and may be functionally divided into two body sections, a lower control baffle section at 28 and an integral, upper agitator, baffle section at 29. In lower section 28, lower flat bars 26 are inclined upwardly and outwardly from bottom flat bar 25, which is horizontal To provide a peak at the top of baffle 12, top flat bars 27 are inclined upwardly and inwardly from the outer ends of bars 26.

The baffle surfaces are provided on the box frame sections, and include agitator baffle plates 30 connected to the outside edges of upper flat bars 27 on both sides of the baffle. Plates 30 are joined together as by welds at their tops. For channeling the flow into pan 13, a pair of control baffle plates 31 are connected to flat bars 26 on both sides of baffle 12. Plates 30 and 31 are elongated and together provide a full flat surface along the length of baffle 12.

As control baffle 12 is disposed over channel 6, plates 31 and their supportive frame sections are disposed adjacent edges 7 and 8 of channel 6 and extend to above foundation 2. The lower ends of plates 31 extend over channel 6 and conveyor 11, leaving a space between edges 7 and 8 and control baffle plates 31 through which portions of material 5 flow in operation. The space between edges 7 and 8 and baffle plates 31 is predetermined to correspond with the desired flow rate of conveyor 11, and may be a uniform distance or a varied spacing along the length of baffle 12 as desired.

To determine the level of material in conveyor 11, a flat bottom plate 32 is provided for baffle 12 and extends fully across the bottom of the baffle to be secured as by welds to bottom flat bars 25. Bottom plate 32 is elongated and secured along its lengthwise edges by suitable welds to the bottom edges of baffle plates 31. In this construction, the flat bottom surface of bottom plate 32 lies horizontally over conveyor 11, being spaced a predetermined distance above the bottom of channel 6 in accordance with the desired capacity and discharge rate of the conveyor. Bottom plate 32 overlies a substantial portion of conveyor 11 and is positioned between foundation edges 7 and 8. Material will flow between baffle plates 31 and edges 7 and 8 to conveyor 11 in operation.

In accordance with the invention, it is desired to limit the material level in conveyor 11 without compacting it. The invention inhibits the material from building up fully to the bottom plate 32. For this purpose, plate 32 has vertical ribs 33 extending longitudinally over its bottom surface. Ribs 33 may be flat bars attached on plate 32 to depend vertically downward with narrow bottom edges facing conveyor 11. The distance downward which ribs 33 extend determines the upper level that the material in pan 13 may reach. In the example shown in FIGS. 1–4, this distance is shown as being uniform among the ribs, and is the same along the full length of baffle 12. The distance is predetermined in accordance with the flow metering desired. Ribs 33 are spaced apart to present a small surface area facing the pan, and primarily with a vibratory conveyor 11, the motion of pan 13 will drive the material therein against only the narrow edges of ribs 33, thereby avoiding compaction of the material. For this purpose the ribs should be as narrow as their structural limitations permit.

As another feature of the invention, agitator baffle section 29 is designed to loosen the stored material 5 in the bin especially where the material is reluctant to flow and whenever an increased flow around control baffle plates 31 is desired. To provide this feature, baffle 12 has a vibrator 34 which causes the baffle to vibrate largely in a plane parallel to foundation 2.

Vibrator 34 may be of any common variety and is shown as a double shaft, electric motor 35, mounted vertically within baffle 12 and having a horizontal eccentric weight 36 on each motor shaft. Motor 35 is mounted at the center of baffle 12 on a rigid plate 37 which is in turn mounted on the appropriate frame bars of the baffle.

Shown schematically, switch 38 is situated in an accessible place outside bin 1 and is electrically connected to motor control 39, also shown schematically. Any suitable switch and control may be used, and in certain applications it would be advisable to include a variable speed control in motor control 39 in order to easily increase or decrease the agitation of baffle 12. By this means, some materials may be caused to flow at a varying preset rate into conveyor 11. The motion of eccentric weights 36 will tend to shake plate 37 and baffle 12 primarily back and forth transversely to the length of baffle 12, the magnitude and direction of the motion being determined by the design of the structure which mounts the baffle in the bin.

To permit such vibration in this plane, while supporting the baffle under the usual weight of material 5, baffle 12 is mounted on several shock mounts 40 to foundation 2. Shock mounts 40 are of a common saddle elastomeric mount construction and are each bolted to a baffle support channel 41 suitably secured to baffle 12. Support channels 41 are bolted to a saddle 42 which is in turn supported on an elastomeric mount 43 held on a base 44 by a cast housing 45 extending around elastomeric mount 43. A nut, bolt and washer assembly 46 connecting mount 43 and saddle 42 complete a shock mount 40 which is suitably mounted as by bolts on foundation 2 on a side of channel 6.

In operation of vibrator 34, eccentric weights 36 will rock baffle 12 back and forth across channel 6 on shock mounts 40. This motion can be used to increase flow into conveyor 11, as desired.

OVERALL OPERATION

A loaded bin 1 is partially unloaded by operating conveyor 11 which will begin vibrating its pan 13 to move any material therein toward discharge end 10. Since baffle 12 relieves conveyor 11 of the weight of material 5, start-up is no problem. As pan 13 is vibrated and the stored material in the pan moves through door 10, material in bin 1 will begin to flow around baffle 12 wherever there is room in the conveyor. Baffle plates 31 on both sides of the baffle will channel the material through the space above ledges 7 and 8 to liner 18 and pan 13. This space is sufficiently large to allow the flow characteristics of the stored material to determine its rate of entry onto liner 18 of the conveyor.

Further control is provided by ribs 33, which in the operation of conveyor 11 level off the material in pan 13. For most applications, it will be desired to provide a space between baffle plates 31 and ledges 7 and 8 sufficient to permit filling to the level of ribs 33.

If the material is not flowing smoothly, or at a sufficient rate, vibrator 34 may be started to put baffle 12 in motion so that agitator baffle plates 30 rock against the stored material to loosen it and cause it to flow around control baffle plates 31.

MODIFICATIONS

Figure 5:
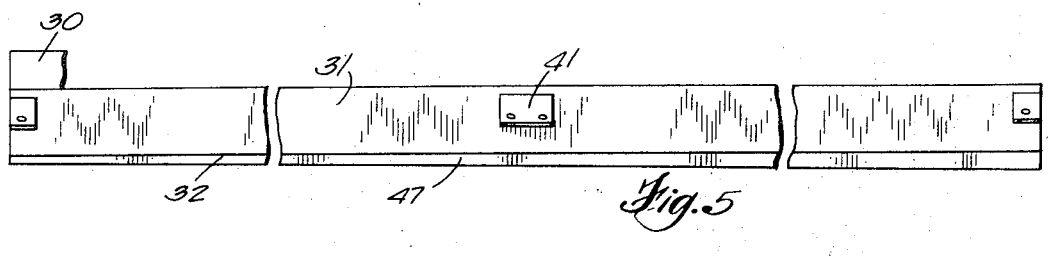
FIG. 5 is a side elevational view of a modified baffle; and a side elevational view of another modified baffle.

The shape and size of the ribs on bottom plate 32 may be varied to vary the flow metering characteristic of baffle 12, and to obtain more uniformity of flow along the length of channel 6. FIG. 5 shows an example of a narrow tapered rib 47. As before, a number of ribs 47 could be provided from flat bars and secured to bottom plate 32 along the full length of baffle 12, with a narrow edge facing the conveyor bottom. The taper is from the front of baffle 12 at end 10 to a greater size at the back. This configuration will determine a lower level in conveyor 11 at the back than further forward, and as the material moves forward in the conveyor, there is room underneath ribs 47 for more material to flow from bin 1. Thus, material will tend to flow around baffle plates 31 into the conveyor all along channel 6, rather than mainly at the back portion, for a more uniform leveling of the load in the bin.

Figure 6:
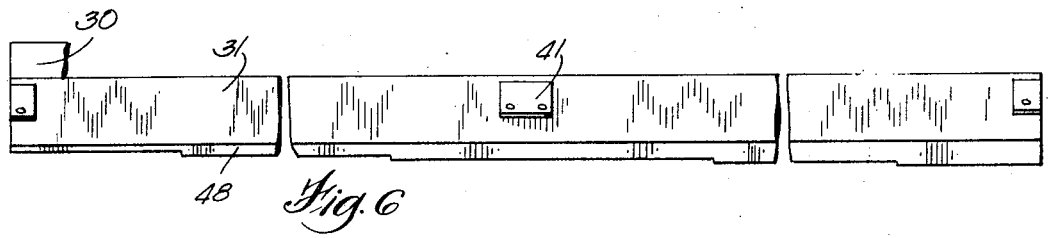

FIG. 6 shows a similarly tapered rib 48, which taper is accomplished in steps in this embodiment. A rib 48 is otherwise the same in structure and operation as a rib 47.

Thus, the structures described are examples of the invention which provide advantageous features of flow metering and load relief for a conveyor unloader in a storage bin.

Various modes of carrying out the invention are contemplated as being within the scope of the following claims which particularly point out and distinctly claim the subject matter which is regarded as the invention.

I claim:

1. In an unloader for unloading friable material stored in a bin, the bin having an elongated channel on its bottom, the unloader including a conveyor having an elongated unloading member operably extending within the channel; a flow control baffle supported by the bin over the elongated channel and conveyor, the baffle having at least one control baffle surface spaced from an adjacent lengthwise edge of the channel, the baffle having further a bottom surface which overlies a corresponding substantial area of the unloading member; and a plurality of elongated ribs extending from the bottom surface a distance beneath the bottom surface predetermined in accordance with the desired level of loading onto said unloading member of said friable material between said control baffle surface and said channel lengthwise edge.

2. The structure of claim 1, wherein the ribs are spaced from each other and have thin edges facing the unloading member at said predetermined distance from the bottom surface of the baffle, the spacing of the ribs being substantially greater than the width of said thin edges.

3. The structure of claim 1, wherein the ribs are flat bars attached to the bottom surface with thin edges of the bars facing down, and the ribs are spaced to provide only insubstantial total surface area of the thin edges overlying the unloading member.

4. The structure of claim 1, wherein the baffle has two elongated baffle surfaces, each extending longitudinally along an opposite lengthwise edge of the channel, the baffle surfaces in their lateral dimension being oppositely inclined downwardly and inwardly toward the channel to extend from above to below the lengthwise edge of the channel, and the bottom surface is attached between the bottom lengthwise edges of the baffle surfaces.

5. The structure of claim 4, wherein the baffle surfaces are in general longitudinal alignment with their respective lengthwise edges of the channel; the ribs are flat bars attached to the bottom surface with thin edges facing the unloading member in the channel; and at least some of the ribs extend in general longitudinal alignment with each baffle surface.

6. The structure of claim 5, wherein the unloading member extends from the back of the bin to an unloading end, and said ribs in longitudinal alignment with the baffle surfaces extend below the bottom surface a predetermined distance which is varied in accordance with the proximity to said unloading end, the predetermined distance being greater toward the back to provide uniform material flow onto the unloading member along its length.

7. A control baffle for a bin unloader lying in an elongated recessed channel at the bottom of a bin adapted for storing a friable material, the baffle being disposed in longitudinal alignment with the channel and having an elongated bottom surface overlying the unloader and additional baffle surfaces which are in longitudinal alignment with an adjacent lengthwise edge of the channel, said additional baffle surfaces being laterally inclined downwardly and inwardly from above to below the lengthwise edge of the channel and providing a flow space between the channel edge and the baffle, and elongated ribs depending from said bottom surface for distances predetermined in accordance with the desired level of loading in the unloader, and said ribs extending in longitudinal alignment with the channel edge.

8. The baffle of claim 7, wherein said flow space is uniform for the full length of the channel edge, and the ribs are elongated flat bars attached with their thin edges facing down.

* * * * *

UNITED STATES PATENT OFFICE
CERTIFICATE OF CORRECTION

Patent No. 3,643,820　　　　　　　　　Dated February 22, 1972

Inventor(s) Ronald W. Hammond

It is certified that error appears in the above-identified patent and that said Letters Patent are hereby corrected as shown below:

Column 2, line 37,　　　　Cancel "Fig. 1" (second occurrence) and substitute therefor ---parts in section to show the invention---

Figure 4:
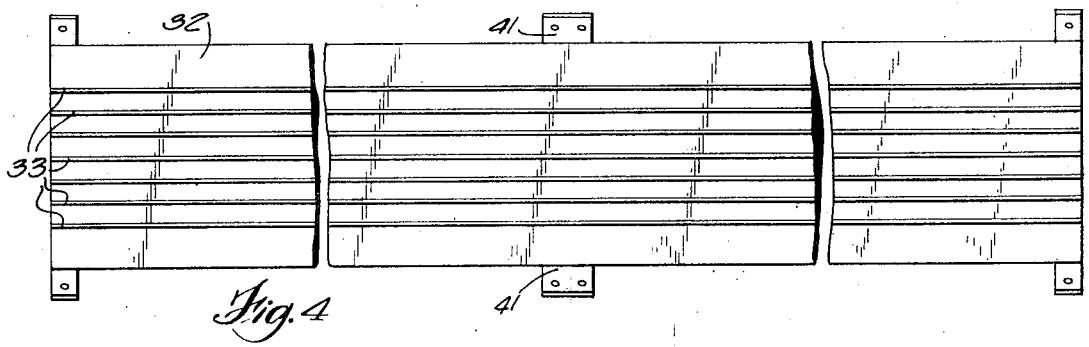
FIG. 4 is a bottom plan view of the baffle; section to show the invention.

Column 2, lines 38-39,　　Cancel "Fig. 4 is a bottom plan view of the baffle; section to show the invention;"

Column 2, line 47,　　　　Cancel "a side elevational view of another modified baffle."

Insert a Figure 6 which reads:

---Fig. 6 is a side elevational view of another modified baffle.---

Signed and sealed this 12th day of September 1972.

(SEAL)
Attest:

EDWARD M. FLETCHER, JR.　　　　　　ROBERT GOTTSCHALK
Attesting Officer　　　　　　　　　Commissioner of Patents